United States Patent Office 3,336,938
Patented Aug. 22, 1967

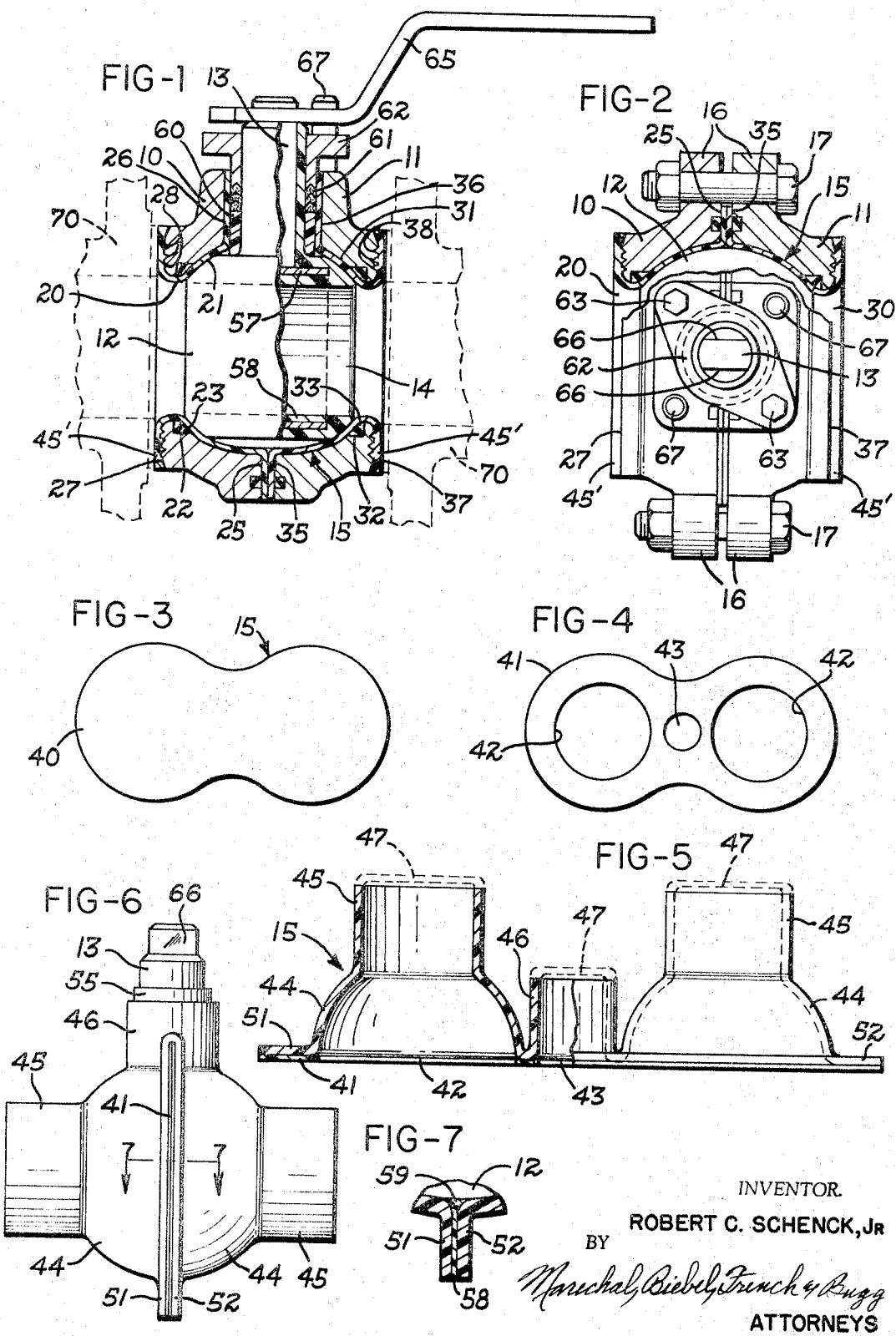

3,336,938
VALVES
Robert C. Schenck, Jr., Dayton, Ohio, assignor to The Duriron Company, Inc., Dayton, Ohio, a corporation of New York
Filed Mar. 19, 1964, Ser. No. 353,107
10 Claims. (Cl. 137—375)

This application relates to ball valves, and more particularly to a corrosion resistant ball valve having special structural and operational features.

The copending application of Jacob B. Freed and Robert C. Schenck, Jr., Ser. No. 353,108, filed Mar. 19, 1964, and assigned to the same assignee as this application, discloses a ball valve of novel and economical construction wherein all metal parts which might come in contact with fluid traversing the valve are covered and protected by a liner member which is fabricated by a novel method from sheet plastic material of corrosion resistant properties, such particularly as fluorocarbon resin. This liner member is formed and assembled in such manner that it can be folded into enveloping relation with the valve ball, and it includes peripheral flange portions which are clamped together in sealing relation between two body members in the completely assembled valve.

Valves constructed in accordance with the Freed and Schenck application as summarized above are satisfactory for many purposes, particularly in relatively small sizes. In accordance with the present invention, however, it has been discovered that for optimum results under all service conditions, particularly with valves of larger sizes, it is desirable that the flange portions of the liner member be bonded together in such manner that the liner member is sealed in enveloping relation with the valve ball while still leaving the ball free to turn as desired within the valve body.

It is accordingly a primary object of the present invention to provide a ball valve of novel and economical construction wherein all metal parts subject to coming in contact with fluid traversing the valve are covered and protected by a liner member which is sealed in enveloping relation with the valve ball while maintaining the ball free to turn with respect to the liner member and the valve body.

An additional object of the invention is to provide a ball valve as outlined in the preceding paragraph wherein the liner member is initially formed of corrosion resistant sheet plastic material and is then formed into enveloping relation with the valve ball and lining relation with the ports of the valve body and is bonded to itself to seal against leakage of fluid traversing the valve either outwardly of the valve body or into contact with any metal part of the valve.

Another major object of the present invention is to provide a novel method of fabricating a corrosion resistant ball valve which includes the steps of forming a liner member out of corrosion resistant sheet plastic material and bonding such liner member to itself in enveloping relation with the valve ball without adhering to the ball so that the latter remains free to rotate with respect to the liner member.

It is a particular object of the present invention to provide a method as outlined in the preceding paragraph which utilizes materials of such thermoplastic properties that the liner member is provided with surface portions capable of being adhered together at a temperature below that at which adhesion between the liner member and the valve ball can occur, thus making possible the final adhering step of the method after assembly of the liner member in enveloping relation with the valve ball without danger of causing adhesion between any parts of the valve ball and the liner member.

Other objects and advantages will be apparent from the following description, the accompanying drawings and the appended claims.

In the drawings:

FIG. 1 is an axial section taken on the line 1—1 of FIG. 2 and showing a valve constructed in accordance with the invention;

FIG. 2 is a plan view of the valve of FIG. 1 which is partially broken away in radial section;

FIG. 3 is a plan view of a liner member blank in accordance with the invention;

FIG. 4 is a plan view of another sheet blank used in the fabrication of the liner member in accordance with the invention;

FIG. 5 is a side elevational view, partly broken away, showing an intermediate stage in the fabrication of the liner member from the blanks of FIGS. 3 and 4;

FIG. 6 is a side elevational view showing the sub-assembly of the valve ball and liner member in accordance with the invention; and FIG. 7 is an enlarged fragmentary section on the line 7—7 of FIG. 6.

Referring to the drawing, which illustrates a preferred embodiment of the invention, the main components of the valve comprise body members 10 and 11, a valve ball 12 having an operating stem 13 and through port 14, and a liner member indicated generally at 15. The body members 10 and 11 are of identical construction and include laterally expanding apertured ear portions 16 through which they are secured together by nuts and bolts 17.

The body member 10 has a port 20 at the outside thereof, and its inner surface 21 is spherically curved substantially complementarily to the ball 12. Its inner surface intermediate the port 20 and portion 21 is formed with a circumferential shoulder 22 which receives a ring 23 of resilient material as best seen in FIG. 4. The inner side 25 of the body member 10 is essentially flat and circular in outline except for a semi-cylindrical portion 26 extending from the top of the valve body to the spherically curved portion 21, and the outer side or end face 27 of member 10 is adapted for connection to a pipe and is provided with multiple grooves 28 concentric with the port 20.

The body member 11 similarly includes a port 30 and spherically curved surface 31 corresponding to the areas 20 and 21 of the body member 10, and it has a similar circumferential shoulder 32 receiving a resilient ring 33. The inner side 35 of the body member 11 is shaped for mating engagement with the side 25 of body member 10, and it includes a similar cylindrically curved groove 36 which cooperates with the groove 26 to define a passageway for the valve stem 13. The outer end face 37 corresponds to end face 27 and is similarly provided with grooves 38.

The liner member 15 and the method by which it is fabricated in accordance with the invention are shown in detail in FIGS. 3-7. The first step is to produce a blank 40 having the outline shown in FIG. 3 of a corrosion resistant sheet plastic material such preferably as a fluorocarbon resin, and the best results have been obtained utilizing the polytetrafluoroethylene resin sold under the trade name "Teflon TFE." The sheet blank 40 is initially cut to a generally figure-eight outline having a length approximately twice its maximum width, and each of the halves of this blank has the major part of its periphery circularly curved to approximately the same dimensions as the circular portion of the inner sides 25 and 35 of the body members 10–11. Satisfactory results have been obtained with the sheet blank 40 approximately ⅛ inch in thickness.

The other starting component of the liner member 15 is a sheet 41 of another fluorocarbon resin which is cut to the same outline as the blank 40 but has two circular holes 42 cut concentrically with the two circularly curved portions of the sheet 41 and a third centrally positioned and smaller hole 43. In accordance with the invention, the sheet 41 consists of a material which is capable of bonding to polytetrafluoroethylene at a relatively high temperature and of bonding to itself at a substantially lower temperature. Optimum results have been obtained in the practice of the invention utilizing a sheet 41 of the fluorinated ethylene propylene copolymer resin sold under the trade name "Teflon FEP," in a thickness of .020 inch.

The next step in the fabrication of the liner member is to superimpose the blanks 40 and 41 and place them in an oven at a temperature which is substantially the gel point of polytetrafluoroethylene, namely approximately 650° F., until the blank 40 appears completely transparent, which requires about fifteen minutes. Under these conditions, the two blanks will fuse together in a permanent bond. The combined blanks are then removed from the oven, and while the material thereof is still relatively soft, it is quickly formed with a suitable forming die and press to the configuration shown in FIG. 5.

Following the forming step just described, the central portion of each half of the blank 40 comprises a tubular portion having its inner end section 44 generally spherically curved and its outer end section 45 generally cylindrical. In addition, a relatively short tubular portion 46 is formed between and equidistant from the spherically curved portions 44. All three of these tubular portions are initially formed with closed outer ends as shown, and in the next fabricating steps, these ends are removed as indicated at 47.

As shown in FIG. 5, the flat portions of the blank 40 remaining after the above forming step define flanges 51–52 which surround the spherically curved portions 44 and meet at the center line through the smaller tubular portion 46. It will therefore now be seen that the original shape of the blank 41 substantially matches the flanges 51–52, with the holes 42 having been located to coincide with the spherically curved portions 44 and the hole 43 overlying the tubular portion 46.

In the next step in accordance with the invention, the composite blank formed as shown in FIG. 5 is folded along its center line around the valve ball 12 until its flanges 51–52 are in face to face relation and the valve stem 13 extends through the tubular portion 46. In addition, a sleeve 55 is fitted over the stem 13 to act as a spacer during this step, and the sleeve 55 may advantageously be formed of the same material as the blank 40. It should also be noted that in the preferred form of the valve of the invention, the ball is constructed of the same corrosion resistant material as the liner blank 40, as is shown in FIG. 1 wherein the ball 12 comprises an annular metal core 56 to which the stem 13 is welded or otherwise secured and which is embedded entirely in a covering of fluorocarbon material indicated at 57.

The assembled ball and liner member are then inserted in place between the body members 10 and 11, and the latter are clamped together. This entire assembly is then placed in an oven at a lower temperature than during the first heating stage, namely a temperature at which the material of layer 41 will fuse but the material of blank 40 and the ball covering 57 will not. Satisfactory results for this purpose have been obtained at a temperature of 575° F. for a period of approximately forty-five minutes in the case of a two-inch valve.

At the end of this second heating stage, the assembly of the ball and liner member will have the appearance indicated in FIGS. 6 and 7, with the layers of resin on the inner faces of the flange portions 51–52 having fused together as indicated at 58 in FIG. 7 so that the flanges 51–52 are thus sealed together around the entire outer surface of the liner member. In addition, it will be noted in FIG. 6 that a portion at the top of the liner member has been re-formed into cylindrical section as an extension of the inner end of the tubular portion 46 so that it substantially matches the outline of the spacer sleeve 55.

The heating step just described will produce some forming of the polytetrafluoroethylene material of the liner blank 40, but it will not cause adhesion between any of this material and the other fluorocarbon resin material of the sheet 41, nor will any of the latter material adhere to the resin covering of the valve ball under the specified temperature conditions. As a result, although the bonding layer will flow sufficiently to match the outer contour of the ball 12 at the junction between the flanges 51–52, as is shown at 59 in FIG. 7, it will not adhere to the ball. Similar results can be obtained if the ball is all of metal, provided it is coated with a suitable release agent for the resin material.

After the second heating step, it is necessary to disassemble the body members from the ball and liner assembly only in order to insert the resilient rings 23 and 33, after which the parts are finally reassembled. Also the spacer sleeve 55 is removed and replaced by the packing shown in FIGS. 1 and 2, which comprises a gland 60, multiple chevron-type packing rings 61, and a gland follower 62 which is adjustably mounted on the body members 10–11 by screws 63. For preferred results, both the gland 60 and packing rings 61 are formed of the same fluorocarbon resin as the liner 15. FIG. 1 also shows the operating handle 65 for the ball which is slotted to receive the flat 66 on the upper end of stem 13, the movements of the handle 65 between the open and closed positions of the valve being limited by a pair of stop pins 67 mounted on body members 10–11 as shown in FIGS. 1–2.

The cylindrical portions 45 of the liner member can be flared to overlie the end faces of the body members before final assembly of the valve, but assembly may be easier if this operation is postponed until after final assembly. In either case, it is readily accomplished by a spinning operation or with a suitable flaring punch. When the valve is clamped in final position between the flanged ends of a pair of pipes, as indicated in dotted lines at 70 in FIG. 1, the flared material of the portions 45 is forced against the body members 10 and 11 until it fills the grooves 28 and 38 and thereby locks the resulting flanges 45' firmly in position over the end faces 27 and 37.

The invention accordingly offers a variety of substantial practical advantages. Thus the fabricating steps of the invention are simple and they have minimum requirements of special tools. In addition, starting with simple sheet plastic materials, the invention provides a fully lined ball valve offering maximum protection against the possibility of leakage either through the valve or to the outside of the valve. Another practical advantage derives from the fact that the ball and liner sub-assembly essentially as shown in FIG. 6 lends itself to use as a replacement unit in the field, particularly since the invention does not require sizing or other fitting operations of the ball and liner in the body.

While the method and article herein described constitute preferred embodiments of the invention, it is to be understood that the invention is not limited to this precise method and article, and that changes may be made therein without departing from the scope of the invention which is defined in the appended claims.

What is claimed is:
1. A corrosion resistant ball valve comprising a pair of complementary body members each defining substantially one-half of a generally spherical body cavity and each having a port at the outer end thereof and having the other end thereof in opposing relation with the opposing end of the other said body member, said body members having said opposing ends thereof defining complementary portions of a passageway for receiving a valve operating stem therethrough, a unitary liner member of corrosion resistant sheet material of substantially uniform thickness enclosed by said body members and including a pair of integral tubular portions each comprising a spherically curved part forming a lining for substantially one-half of said body cavity through and forming a lining for the adjacent said port, said liner member including a third integral tubular portion projecting radially from said spherically curved parts into and forming a lining in said passageway, said liner member also including integral flange portions extending in face to face relation generally radially outwardly from the peripheries of said spherically curved parts respectively and projecting from said body cavity between said opposing ends of said body members, a ball member received in said liner member in sealing relation with said liner member and including an operating stem extending through said third tubular portion of said liner member to the outside of said valve, means adhering said flange portions of said liner member together in sealed relation around said ball member, and means clamping said body members together.

2. A corrosion resistant ball valve as defined in claim 1 comprising auxiliary annular seal means positioned between said valve stem and said third tubular portion of said liner member, and adjustable means for compressing said auxiliary seal means into sealing relation with both said valve stem and said third tubular portion of said liner member.

3. A corrosion resistant ball valve comprising a pair of complementary body members each defining substantially one-half of a generally spherically body cavity and each having a port at the outer end thereof and having the other end thereof in opposing relation with the opposing end of the other said body member, said body members having said opposing ends thereof defining complementary portions of a passageway for receiving a valve operating stem therethrough, a unitary liner member consisting of a first fluorocarbon resin sheet material of substantially uniform thickness enclosed by said body members and including a pair of integral tubular portions each comprising a spherically curved part forming a lining for substantially one-half of said body cavity through and forming a lining for the adjacent said port, said liner member including a third integral tubular portion projecting radially from said spherically curved parts into and forming a lining in said passageway, said liner member also including integral flange portions extending generally radially outwardly from the peripheries of said spherically curved parts respectively and projecting from said body cavity between said opposing ends of said body members, a ball member received in said liner member in sealing relation with said liner member and including an operating stem extending through said third tubular portion of said liner member to the outside of said valve, each of the said flange portions of said liner member having adhered to the inner face thereof a surface layer of a second fluorocarbon resin characterized by the ability to bond to itself at a substantially lower temperature than the lowest temperature at which it will bond to said first fluorocarbon resin, said surface layers being bonded to each other in seal-forming relation around said ball member, and means clamping said body members together.

4. A corrosion resistant ball valve as defined in claim 3 wherein said first fluorocarbon resin is polytetrafluoroethylene and said second fluorocarbon resin is fluoroinated ethylene propylene copolymer.

5. A corrosion resistant ball valve comprising a pair of complementary body members each defining substantially one-half of a generally spherical body cavity and each having a port at the outer end thereof and having the other end thereof in opposing relation with the opposing end of the other said body member, said body members having said opposing ends thereof defining complementary portions of a passageway for receiving a valve operating stem therethrough, a unitary liner member of a first corrosion resistant fluorocarbon resin sheet material of substantially uniform thickness enclosed by said body members and including a pair of integral tubular portions each comprising a spherically curved part forming a lining for substantially one-half of said body cavity through and forming a lining for the adjacent said port, said liner member including a third integral tubular portion projecting radially from said spherically curved parts into and forming a lining in said passageway, said liner member also including integral flange portions extending generally radially outwardly from the peripheries of said spherically curved parts respectively and projecting from said body cavity between said opposing ends of said body members, a ball member received in said liner member in sealing relation with said liner member and having an operating stem extending through said third tubular portion of said liner member to the outside of said valve, all surface portions of said ball member within said body members being composed of the same fluorocarbon resin material as said liner member, other fluorocarbon resin material bonding said flange portions of said liner member together in areas surrounding but spaced from said ball member, and means clamping said body members together.

6. A corrosion resistant ball valve as defined in claim 5 wherein said first fluorocarbon resin material is polytetrafluoroethylene and said other fluorocarbon material is fluorinated ethylene propylene copolymer.

7. The method of fabricating a liner member for a corrosion resistant ball valve from a sheet of corrosion resistant plastic material which comprises the steps of cutting said sheet to a length approximately twice the width hereof, forming the central portion of each half of said sheet in the same direction out of the plane of said sheet to provide a pair of parallel tubular portions each surrounded by a flange portion of said sheet, forming the central portion of said sheet into a third tubular portion between and said substantially smaller than said pair of tubular portions, folding said sheet along the center line across the width thereof to bring said flange portions and the inner ends of said pair of tubular portions into face-to-face aligned relation defining an open chamber with said third tubular portion forming a passageway extending radially outwardly from said chamber between said flange portions, enclosing a valve ball within said chamber and with the stem thereof extending through said passageway, and bonding said flange portions of said liner member together while maintaining said ball member free to rotate in said chamber.

8. The method of fabricating a liner member for a corrosion resistant ball valve from a sheet of corrosion resistant plastic material which comprises the steps of cutting said sheet to a length approximately twice the width thereof, bonding a layer of adhesive material to a continuous peripheral area on one surface of said sheet, forming the central portion of each half of said sheet out of the plane of said sheet in the direction away from said layer to provide a pair of parallel tubular portions each surrounded by a flange portion of said sheet having a portion of said layer bonded thereto, forming the central portion of said sheet into a third tubular portion between and substantially smaller than said pair of tubular portions, folding said sheet along the center line across the width thereof to bring said flange portions together and the inner ends of said pair of tubular portions into face-to-face aligned relation defining an open chamber with said third tubular portion forming a passageway extending radially outwardly from said chamber between said flange portions, enclosing a valve ball within said chamber with the stem thereof extending through said passageway, and bonding said flange portions of said liner member together by causing the portions of said layer thereon to fuse together.

9. The method of fabricating a liner member for a corrosion resistant ball valve from a sheet of a first corrosion resistant fluorocarbon resin material which comprises the steps of cutting said sheet to a length approximately twice the width thereof, superimposing on a continuous peripheral area of said sheet a layer of another fluorocarbon resin material capable of bonding to said first fluorocarbon resin at a high temperature and to itself at a lower temperature, heating said sheet and layer to said high temperature until said layer and sheet are bonded together, forming the central portion of each half of said sheet out of the plane of said sheet in the direction away from said layer to provide a pair of parallel tubular portions each surrounded by a flange portion of said sheet having a portion of said layer bonded thereto, forming the central portion of said sheet into a third tubular portion between and substantially smaller than said pair of tubular portions, folding said sheet along the center line across the width thereof to bring said flange portions and the inner ends of said pair of tubular portions into face-to-face aligned relation defining an open chamber with said third tubular portion forming a passageway extending radially outwardly from said chamber between said flange portions, enclosing a valve ball within said chamber with the stem thereof extending through said passageway, pressing said flange portions of said liner member together and heating all of said parts to said lower temperature until said portions of said layer on said flange portions have fused together.

10. The method defined in claim 9 wherein said first fluorocarbon resin material is polytetrafluoroethylene and said other fluorocarbon material is fluorinated ethylene propylene copolymer.

References Cited

UNITED STATES PATENTS

| | | | |
|---|---|---|---|
| 2,721,600 | 10/1955 | Perryman | 156—292 X |
| 3,108,779 | 10/1963 | Anderson | 251—317 X |
| 3,124,334 | 3/1964 | Szohatsky | 251—315 X |
| 3,244,398 | 4/1966 | Scaramucci | 251—317 X |

FOREIGN PATENTS 647,005   8/1962   Canada.

M. CARY NELSON, *Primary Examiner.*

HENRY T. KLINKSIEK, *Examiner.*